US008918065B2

(12) United States Patent
Ihm et al.

(10) Patent No.: US 8,918,065 B2
(45) Date of Patent: Dec. 23, 2014

(54) WIRELESS COMMUNICATION SYSTEM FOR HIGH-SPEED VEHICLE TRAVELLING OVER FIXED PATH

(75) Inventors: Bin Chul Ihm, Anyang-si (KR); Hyun Soo Ko, Anyang-si (KR); Moon Il Lee, Anyang-si (KR); Jin Young Chun, Anyang-si (KR); Wook Bong Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 343 days.

(21) Appl. No.: 13/498,726

(22) PCT Filed: Oct. 15, 2010

(86) PCT No.: PCT/IB2010/002637
§ 371 (c)(1),
(2), (4) Date: Mar. 28, 2012

(87) PCT Pub. No.: WO2011/045665
PCT Pub. Date: Apr. 21, 2011

(65) Prior Publication Data
US 2012/0184317 A1 Jul. 19, 2012

Related U.S. Application Data

(60) Provisional application No. 61/250,577, filed on Oct. 12, 2009.

(30) Foreign Application Priority Data

Sep. 1, 2010 (KR) .................. 10-2010-0085351

(51) Int. Cl.
H04B 1/02 (2006.01)
H04L 5/00 (2006.01)
H04W 48/12 (2009.01)
H04B 7/04 (2006.01)
H04B 7/26 (2006.01)

(52) U.S. Cl.
CPC ............. *H04L 5/0048* (2013.01); *H04W 48/12* (2013.01); *H04B 7/04* (2013.01); *H04B 7/2606* (2013.01); *H04L 5/0023* (2013.01)
USPC .......................................... 455/101; 370/208

(58) Field of Classification Search
USPC ................. 455/101, 562.1; 375/267
See application file for complete search history.

(56) References Cited

U.S. PATENT DOCUMENTS

| 8,130,857 B2* | 3/2012 | Kim et al. ...................... 375/267 |
| 2009/0067522 A1 | 3/2009 | Kwak et al. |
| 2009/0067534 A1 | 3/2009 | Kwak et al. |
| 2009/0122901 A1 | 5/2009 | Choi et al. |

FOREIGN PATENT DOCUMENTS

KR 10-2009-0055467 A 6/2009

OTHER PUBLICATIONS

Lin et al., "Design Considerations of Pilot Structures for Downlink MIMO Transmission," IEEE 802.16 Broadband Wireless Access Working Group, IEEE C802.16m-08/139r2, Mar. 10, 2008.

(Continued)

Primary Examiner — Tu X Nguyen
(74) Attorney, Agent, or Firm — Morgan, Lewis & Bockius LLP

(57) ABSTRACT

The present invention discloses a method for transmitting a same pilot sequence from a transmitting end to a receiving end in a multi-antenna wireless communication system. In particular, the method comprises the steps of: setting an identical pilot pattern in a plurality of transmitting antennas, allocating respectively different pilot sequences to the set pilot patterns, and transmitting the allocated pilot sequences to the receiving end, wherein at least one of the transmitting antennas forms a valid communication link with one of the receiving antennas. Here, when there is a plurality of valid communication links, the plurality of communication links are mutually independent.

8 Claims, 8 Drawing Sheets

(56) References Cited

OTHER PUBLICATIONS

Wang et al., "Pilot Design in High-mobility Zone for 802.16m,", IEEE 802.16 Broadband Wireless Access Working Group, IEEE C802.16m-081135R3, Mar. 19, 2008.

Wang et al., "Proposal for Pilot Allocation in High-Mobility Resource Block," IEEE 802.16 Broadband Wireless Access Working Group, IEEE C802.16m-08/310r1, May 9, 2008.

Written Opinion and International Search Report issued in corresponding PCT International Application No. PCT/IB2010/002637 mailed Jul. 26, 2011.

\* cited by examiner

WIRELESS COMMUNICATION SYSTEM FOR HIGH-SPEED VEHICLE TRAVELLING OVER FIXED PATH

This is a U.S. National Phase Entry of PCT Application No. PCT/IB2010/002637, filed Oct. 15, 2010, and claims the benefit of Korean Patent Application No. 10-2010-0085351 filed Sep. 1, 2010 and claims the benefit of U.S. Provisional Application No. 61/250,577 filed Oct. 12, 2009.

TECHNICAL FIELD

The present invention relates to a wireless communication system, and more particularly to a wireless communication system for a high-speed vehicle travelling over a fixed path.

BACKGROUND ART

A 4G cellular communication system which is currently discussed is designed on the basis of one basic frame, and is also designed to optimize throughput by targeting a user who moves at low speed. Although this 4G cellular communication system is designed to support even a user who moves at high speed of 350 km/h, throughput of such high speed is less than that of low speed. If the cellular communication system is applied to a high-speed train, link quality between a network and the high-speed train is deteriorated due to high mobility of the high-speed train of which speed is 350 km/h, and it is difficult to obtain sufficient link capacity. In this respect, if the speed of the high-speed train exceeds 500 km/h in accordance with the development of technology, it is expected that throughput degradation may be more serious and quality of wireless data service for passengers will be deteriorated significantly. Also, the high-speed train may partially use capacity of a macro base station. In this case, it may deteriorate data communication of other users within a cell.

In this respect, wire communication not wireless communication may be used for communication between the network and the high-speed train. For example, although communication between the high-speed train and the network is performed through an alternating current signal by using tracks in contact with the high-speed train, such a system has problems in that capacity of the tracks is low and it is difficult to obtain more links due to physical restriction that the number of tracks for simultaneous access is limited to 2. Likewise, although there may be provided a power line communication (PLC) system that performs communication using a power line, this system has the same problems as those of the system based on the tracks and also has a problem in that it cannot be applied to a train having no power line.

Under the circumstances, the present invention suggests a transmitting and receiving antenna structure that provides data communication of high speed and a method for minimizing pilot overhead by improving a multi-antenna scheme in the LTE/LTE-A and IEEE802.16m system of the related art to obtain more data capacity.

DISCLOSURE

Technical Problem

Accordingly, an object of the present invention devised to solve the conventional problem is to provide a communication system for a high-speed vehicle traveling over a fixed path.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the aforementioned technical problems, according to one embodiment of the present invention, a method for transmitting a pilot sequence from a transmitting end to a receiving end in a multi-antenna wireless communication system comprises the steps of setting a same pilot pattern to each of a plurality of transmitting antennas; allocating different pilot sequences to the set pilot patterns; and transmitting the allocated pilot sequences to the receiving end, wherein at least one of the transmitting antennas forms a valid communication link with one of the receiving antennas. In this case, when there are a plurality of valid communication links, the plurality of communication links are mutually independent.

Also, when the number of data layers is smaller than that of the valid communication links, the method further comprises the step of transmitting at least one of the data layers to the receiving end through at least two or more of the transmitting antennas.

Moreover, when data streams more than the pilot sequences are intended to be transmitted, the different pilot sequences include pilot sequences cyclic shifted for basic pilot sequences and pilot sequences permuted and cyclic shifted for the basic pilot sequences.

Preferably, the transmitting antenna forming the valid communication link has a signal power received from the receiving antenna, the signal power being greater than a previously set threshold value.

To solve the aforementioned technical problems, according to another embodiment of the present invention, a base station in a multi-antenna wireless communication system comprises a processor setting a same pilot pattern to each of a plurality of transmitting antennas, and allocating different pilot sequences to the set pilot patterns; and a transmission module transmitting the allocated pilot sequences to a receiving end, wherein at least one of the transmitting antennas of the base station forms a valid communication link with one of the receiving antennas. In this case, when there are a plurality of valid communication links, the plurality of communication links are mutually independent.

Also, when the number of data layers is smaller than that of the valid communication links, wherein the transmission module repeatedly transmits at least one of the data layers to the receiving end through at least two or more of the transmitting antennas.

Advantageous Effects

The communication system according to the present invention can improve communication efficiency and throughput of users within a mobile vehicle that moves at high speed.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Furthermore, in the following description, it is assumed that a terminal means a mobile or fixed type user terminal such as a user equipment (UE), a mobile station (MS) and an advanced mobile station (AMS). It is also assumed that a base station means a random node of a network node, such as Node B, eNode B and access point (AP), which performs communication with a mobile station.

Figure 1:
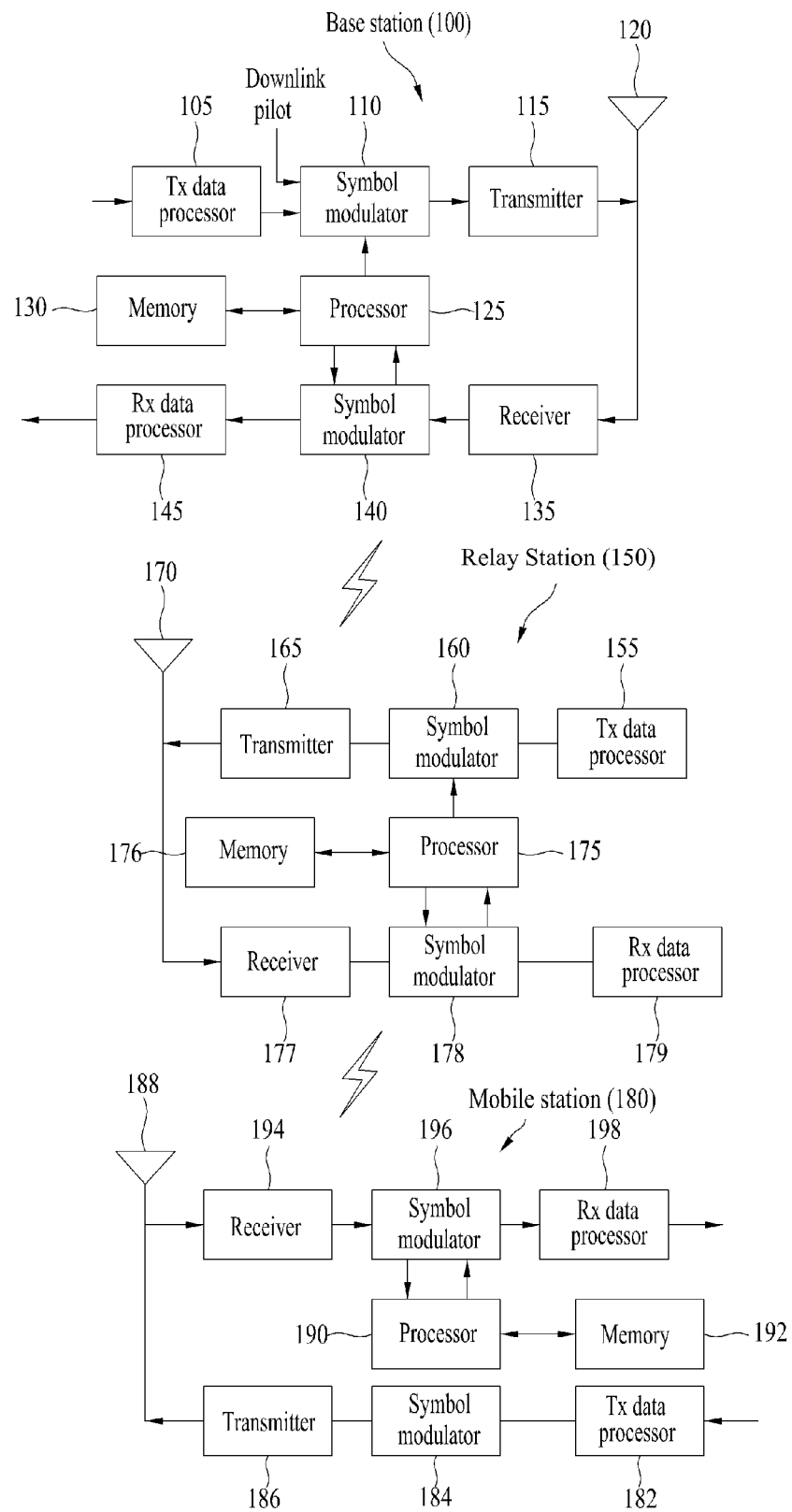
FIG. 1 is a block diagram illustrating a configuration of a communication system according to the present invention.

FIG. 1 is a block diagram illustrating a configuration of a communication system according to the present invention.

The communication system according to the present invention may include a base station 100, a relay station 150, a mobile station 180, and a network (not shown). Although one base station 100, one relay station 150, and one mobile station 180 are shown for simplification of the communication system, the wireless communication system according to the present invention may include a plurality of base stations, a plurality of relay stations, and a plurality of mobile stations.

Referring to FIG. 1, the base station 100 may include a transmitting (Tx) data processor 105, a symbol modulator 110, a transmitter 115, a transmitting and receiving antenna 120, a processor 125, a memory 130, a receiver 135, a symbol demodulator 140, and a receiving (Rx) data processor 145. The relay station 150 may include a Tx data processor 155, a symbol modulator 160, a transmitter 165, a transmitting and receiving antenna 170, a processor 175, a memory 176, a receiver 177, a symbol demodulator 178, and an Rx data processor 179. Also, the mobile station 180 may include a Tx data processor 182, a symbol modulator 184, a transmitter 186, a transmitting and receiving antenna 188, a processor 190, a memory 192, a receiver 194, a symbol demodulator 196, and an Rx data processor 198.

Although the antennas 120, 170 and 188 are respectively shown in the base station 100, the relay station 150 and the mobile station 180, each of the base station 100, the relay station 150 and the mobile station 180 includes a plurality of antennas. Accordingly, the base station 100, the relay station 150 and the mobile station 180 according to the present invention support a multiple input multiple output (MIMO) system. The base station 100, the relay station 150 and the mobile station 180 according to the present invention may support both a single user-MIMO (SU-MIMO) system and a multi user-MIMO (MU-MIMO) system.

On a downlink, the Tx data processor 105 of the base station 100 receives traffic data, formats and codes the received traffic data, interleaves and modulates (or symbol maps) the coded traffic data, and provides the modulated symbols ("data symbols"). The symbol modulator 110 receives and processes the data symbols and pilot symbols and provides streams of the symbols.

The symbol modulator 110 of the base station 100 multiplexes the data and pilot symbols and transmits the multiplexed data and pilot symbols to the transmitter 115. At this time, the respective transmitted symbols may be a signal value of zero, the data symbols and the pilot symbols. In each symbol period, the pilot symbols may be transmitted contiguously. The pilot symbols may be frequency division multiplexing (FDM) symbols, orthogonal frequency division multiplexing (OFDM) symbols, time division multiplexing (TDM) symbols, or code division multiplexing (CDM) symbols.

The transmitter 115 of the base station 100 receives the streams of the symbols and converts the received streams into one or more analog symbols. Also, the transmitter 115 of the base station 100 generates downlink signals suitable for transmission through a radio channel by additionally controlling (for example, amplifying, filtering and frequency upconverting) the analog signals. Subsequently, the downlink signals are transmitted to the mobile station through the antenna 120.

The receiving antenna 170 of the relay station 150 may receive the downlink signals from the base station 100. The processor 175 of the relay station 150 may demodulate and process the downlink signals received from the base station 100 and then transmit the processed downlink signals to the mobile station 100 through the transmitting antenna 170. Also, the receiving antenna 170 of the relay station 150 may receive uplink signals from the mobile station 110. The processor 175 of the relay station 150 may demodulate and process the uplink signals from the mobile station 110 and then transmit the processed uplink signals to the base station 110.

The antenna 188 of the mobile station 180 receives the downlink signals from the base station 100 or the relay station 150 and provides the received signals to the receiver 194. The receiver 194 controls (for example, filters, amplifies and frequency downcoverts) the received signals and digitalizes the controlled signals to acquire samples. The symbol demodulator 196 demodulates the received pilot symbols and provides the demodulated pilot symbols to the processor 190 to perform channel estimation.

Also, the symbol demodulator 196 receives a frequency response estimation value for the downlink from the processor 190, acquires data symbol estimation values (estimation values of the transmitted data symbols) by performing data demodulation for the received data symbols, and provides the data symbol estimation values to the Rx data processor 198. The Rx data processor 198 demodulates (i.e., symbol demapping), deinterleaves, and decodes the data symbol estimation values to recover the transmitted traffic data.

Processing based on the symbol demodulator 196 and the Rx data processor 198 is complementary to processing based on the symbol demodulator 110 and the Tx data processor 105 at the base station 100.

On an uplink, the Tx data processor 182 of the mobile station 180 processes traffic data and provides data symbols. The symbol modulator 184 receives the data symbols, multiplexes the received data symbols with the pilot symbols, performs modulation for the multiplexed symbols, and provides the streams of the symbols to the transmitter 186. The transmitter 186 receives and processes the streams of the symbols and generates uplink signals. The uplink signals are transmitted to the base station 100 or the relay station 150 through the antenna.

The uplink signals are received in the base station 100 from the mobile station 180 through the antenna 120, and the receiver 190 processes the received uplink signals to acquire samples. Subsequently, the symbol demodulator 196 processes the samples and provides data symbol estimation values and the pilot symbols received for the uplink. The Rx data processor 198 recovers the traffic data transmitted from the mobile station 180 by processing the data symbol estimation values.

The processors 125, 175, and 190 of the base station 100, the relay station 150 and the mobile station 180 respectively command (for example, controls, adjusts, manages, etc.) the operation at the base station 100, the relay station 150 and the mobile station 180. The processors 125, 175 and 190 may respectively be connected with the memories 130, 176 and 192 that store program codes and data. The memories 130, 176 and 192 respectively connected to the processors 125, 175 and 190 store operating system, application, and general files therein.

Each of the processors 125, 175 and 190 may be referred to as a controller, a microcontroller, a microprocessor, and a microcomputer. Meanwhile, the processors 125, 175 and 190 may be implemented by hardware (or firmware), software, or their combination. If the embodiment of the present invention is implemented by hardware, application specific integrated circuits (ASICs), digital signal processors (DSPs), digital signal processing devices (DSPDs), programmable logic devices (PLDs), and field programmable gate arrays (FPGAs) configured to perform the embodiment of the present invention may be provided in the processors 125, 175 and 190.

Meanwhile, if the embodiment according to the present invention is implemented by firmware or software, firmware or software may be configured to include a module, a procedure, or a function, which performs functions or operations of the present invention. Firmware or software configured to perform the present invention may be provided in the processors 125, 175 and 190, or may be stored in the memories 130, 176 and 192 and driven by the processors 125, 175 and 190.

Layers of a radio interface protocol between the base station 100, the relay station 150 or the mobile station 180 and a wireless communication system (network) may be classified into a first layer L1, a second layer L2 and a third layer L3 on the basis of three lower layers of OSI (open system interconnection) standard model widely known in communication systems. A physical layer belongs to the first layer L1 and provides an information transfer service using a physical channel. A radio resource control (RRC) layer belongs to the third layer and provides control radio resources between the mobile station 180 and the network. The base station 100, the relay station 150 and the mobile station 180 exchange RRC messages with one another through the RRC layer.

Examples of communication methods that may be used by passengers of a high-speed train may include a method for allowing a passenger to directly access a mobile communication network and a method for allowing a passenger to access a network through a relay which is a high-speed train. As compared with the former method, the latter method may reduce the number of handover times and allow more data to be exchanged between the relay and the passenger through a more improved method such as closed loop-MIMO (CL-MIMO) because there is no relay speed between the relay and the passenger. In this specification, in case that the high-speed train serves as a bridge for data communication between the network and the passenger in the same manner as the latter method, a method for maximizing link capacity between the network and the high-speed train will be suggested.

Hereinafter, a method for constructing a link between a high-speed mobile vehicle (for example, high-speed train) in a communication system according to the present invention will be described. In more detail, a method for maximizing link capacity between a network and a high-speed mobile vehicle using a plurality of antennas will be described.

Figure 2:
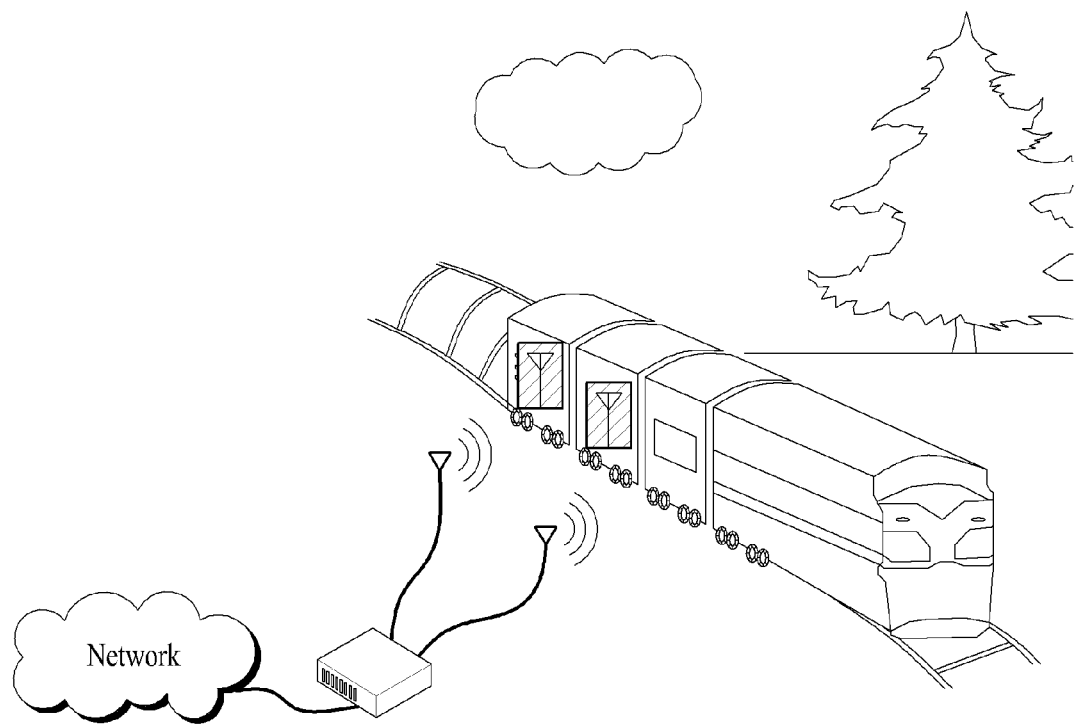
FIG. 2 is a diagram illustrating an example of a communication system according to the embodiment of the present invention.

FIG. 2 is a diagram illustrating an example of a communication system according to the embodiment of the present invention.

Referring to FIG. 2, the communication system includes a network and a base station 100 connected with the network. In this case, the base station 100 may be various types such as access point (AP), macro cell base station (Macrocell BS) and femto cell base station (Femtocell BS). The base stations may be arranged at predetermined intervals along a track or railroad of a high-speed mobile vehicle (hereinafter, high-speed train will be described as an example of the high-speed mobile vehicle). The base station 100 that covers a specific zone may include a plurality of antennas. The base station may be connected to the plurality of antennas of the base station through wire or wireless.

A transmission power of each transmitting antenna (or transmitting antenna group) of the base station and the distance between the transmitting antennas (or transmitting antenna groups) or between the transmitting antennas (or receiving antenna groups) may be controlled such that one transmitting antenna (or transmitting antenna group) may affect only one receiving antenna (or receiving antenna group) 210. In this case, one antenna group of the high-speed train and one antenna group of the base station 100 may form a communication link of 1:1. The receiving antenna group may be comprised of one or more physical antennas, and one receiving antenna group may be arranged per vehicle of the high-speed train.

Figure 3:
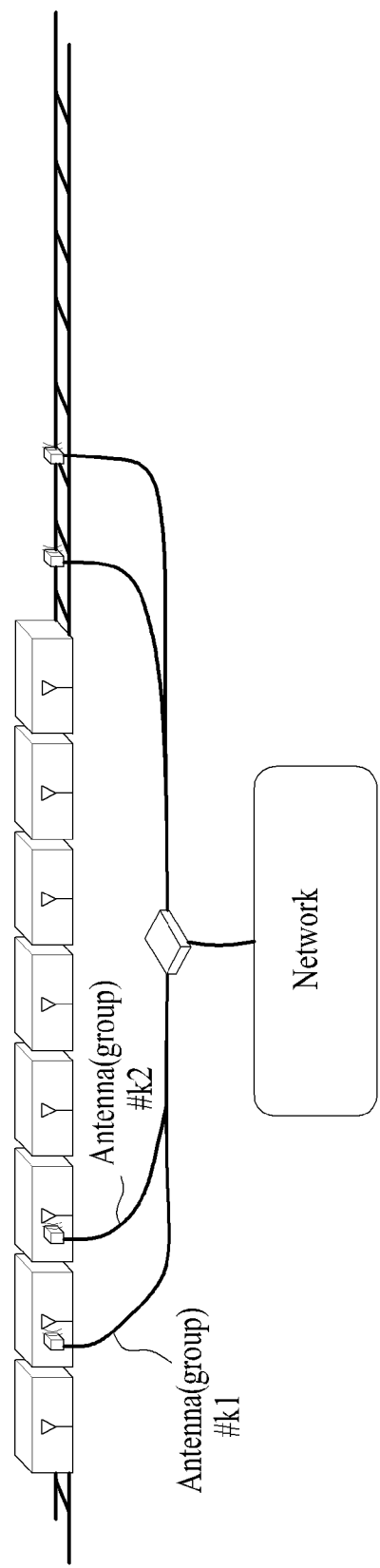
FIG. 3 is a diagram illustrating an example of antenna arrangement in a communication system according to the embodiment of the present invention.

FIG. 3 is a diagram illustrating an example of antenna arrangement in a communication system according to the embodiment of the present invention. In particular, FIG. 3 illustrates that receiving antennas (or receiving antenna groups) more than transmitting antennas (or transmitting antenna groups) of the base station are arranged at an interval corresponding to a full length of the high-speed train.

Referring to FIG. 3, only some of the receiving antennas (or receiving antenna groups) of the high-speed train may form a communication channel. Also, as the high-speed train moves, receiving antennas (or receiving antenna groups) substantially constituting a communication channel of valid quality may be changed.

Figure 4:
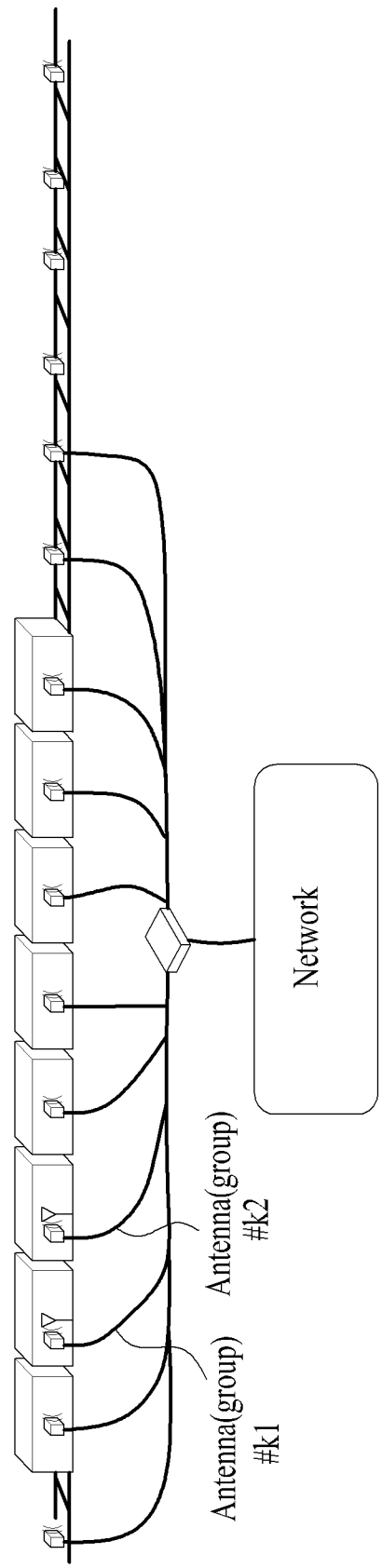
FIG. 4 is a diagram illustrating another example of antenna arrangement in a communication system according to the embodiment of the present invention.

FIG. 4 is a diagram illustrating another example of antenna arrangement in a communication system according to the embodiment of the present invention. In particular, FIG. 4 illustrates that receiving antennas (or receiving antenna groups) of the base station, which are more than or equal to transmitting antennas (or transmitting antenna groups) of the high-speed train, are arranged at an interval corresponding to a full length of the high-speed train.

Referring to FIG. 4, the receiving antennas (or receiving antenna groups) of the high-speed train, in which a communication channel of valid quality is actually formed, are all arranged regardless of movement of the high-speed train.

In the mean time, since the transmitting antennas (transmitting antenna group) of the base station, in which a communication channel of valid quality is actually formed, are changed in accordance with the movement of the high-speed train, data transmission of the AP may be performed by only specific transmitting antennas (or transmitting antenna group) in accordance with the movement of the high-speed train. The specific transmitting antennas (or transmitting antenna group) of the base station may be selected from transmitting antennas (or transmitting antenna group) of a predicted path or transmitting antennas (or transmitting antenna group) having a signal power which is fed back from the receiving antennas and exceeds a threshold value, by considering moving track or moving speed of the high-speed train. Considering error of measurement or prediction in the two methods, the transmitting antennas (or transmitting antenna group) arranged to be physically close to the transmitting antennas (or transmitting antenna group) selected by the above method may take part in transmission.

In this antenna structure and arrangement, user ID may be allocated to each of the receiving antennas (or receiving antenna group) and may be managed independently, whereby a separate communication link may be managed for each of the receiving antennas (or receiving antenna group). However, in case that the communication link is managed for each of the receiving antennas (or receiving antenna group), the number of user IDs is increased and overhead of the control channel such as PDCCH or MAP is increased. Accordingly, it is preferable that single ID is allocated to multiple antennas.

Unlike a mobile station such as a normal terminal or notebook computer, in the communication system of the present invention, since one receiving antenna (or receiving antenna group) forms a communication channel of valid quality together with one transmitting antenna (or transmitting antenna group) and forms a channel of a poor level together with the other transmitting antennas (or transmitting antenna group), data and pilot may be used to overlap the same radio resource.

Hereinafter, a method for minimizing pilot overhead to obtain more data capacity in an LTE/LTE-A system and an IEEE 802.16m system having a transmitting and receiving antenna structure according to the embodiment of the present invention will be described.

<LTE/LTE-A System>

Prior to description of a method for reducing pilot overhead in accordance with the present invention, a structure of a radio frame of the LTE system will be described.

Figure 5:
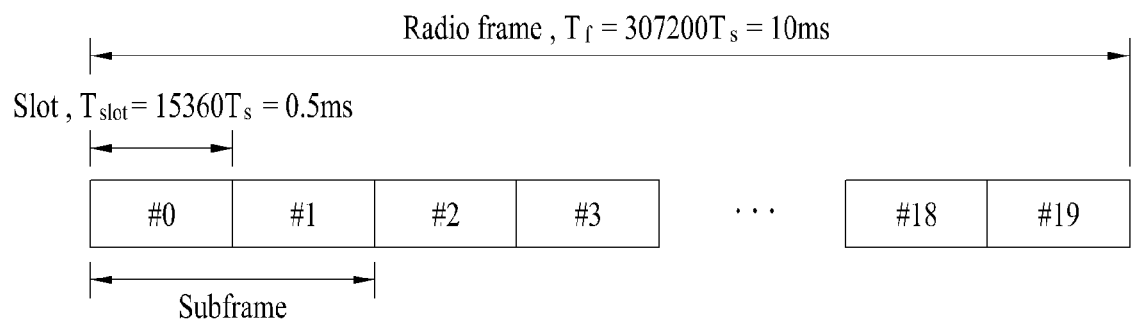
FIG. 5 is a diagram illustrating an example of a structure of a radio frame used in an LTE system.

FIG. 5 is a diagram illustrating an example of a structure of a radio frame used in an LTE system.

Referring to FIG. 5, the radio frame has a length of 10 ms ($327200 \times T_s$) and includes ten (10) subframes of an equal size. Each sub frame has a length of 1 ms and includes two slots. Each slot has a length of 0.5 ms ($15360 \times T_s$). In this case, $T_s$ represents a sampling time, and is expressed by $T_s=1/(15 \text{ kHz} \times 2048)=3.2552 \times 10^{-8}$ (about 33 ns). The slot includes a plurality of orthogonal frequency division multiplexing (OFDM) symbols in a time domain, and includes a plurality of resource blocks (RBs) in a frequency domain. In the LTE system, one resource block includes twelve (12) subcarriers× seven (or six) OFDM symbols. A transmission time interval (TTI), which is a transmission unit time of data, may be determined in a unit of one or more subframes. The aforementioned structure of the radio frame is only exemplary, and various modifications may be made in the number of subframes included in the radio frame or the number of slots included in the subframe, or the number of OFDM symbols or SC-FDMA symbols included in the slot.

Figure 6:
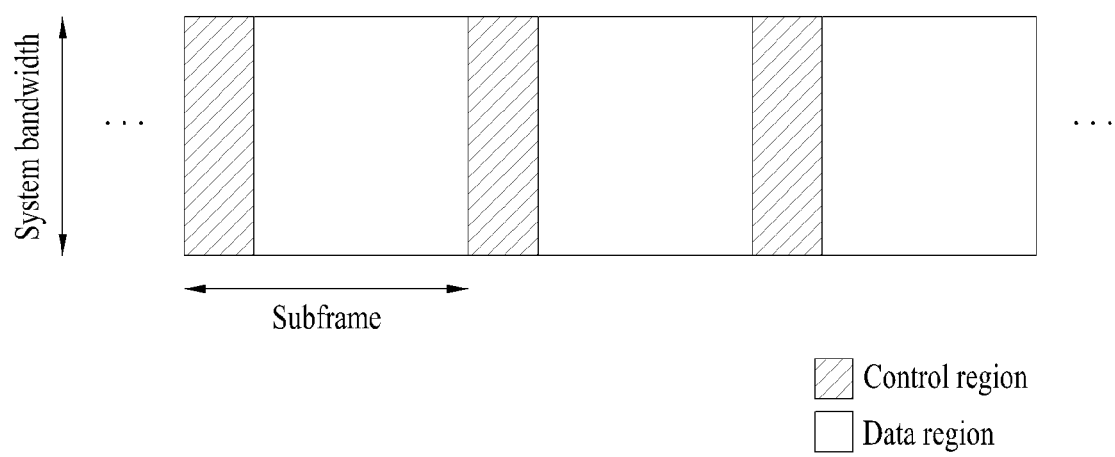
FIG. 6 is a diagram illustrating an example of a structure of a downlink radio frame used in an LTE system.

FIG. 6 is a diagram illustrating an example of a structure of a downlink radio frame used in an LTE system.

Referring to FIG. 6, the downlink radio frame includes ten subframes having an equal length. In the 3GPP LTE system, the subframes are defined in a basic time unit of packet scheduling for all downlink frequencies. Each subframe is divided into a control region for transmission of scheduling information and other control information and a data region for transmission of downlink data. The control region starts from the first OFDM symbol of the subframe and includes one or more OFDM symbols. The control region may have a size set independently per subframe. The control region is used to transmit L1/L2 (layer 1/layer 2) control signals. The data region is used to transmit downlink traffic.

Figure 7:
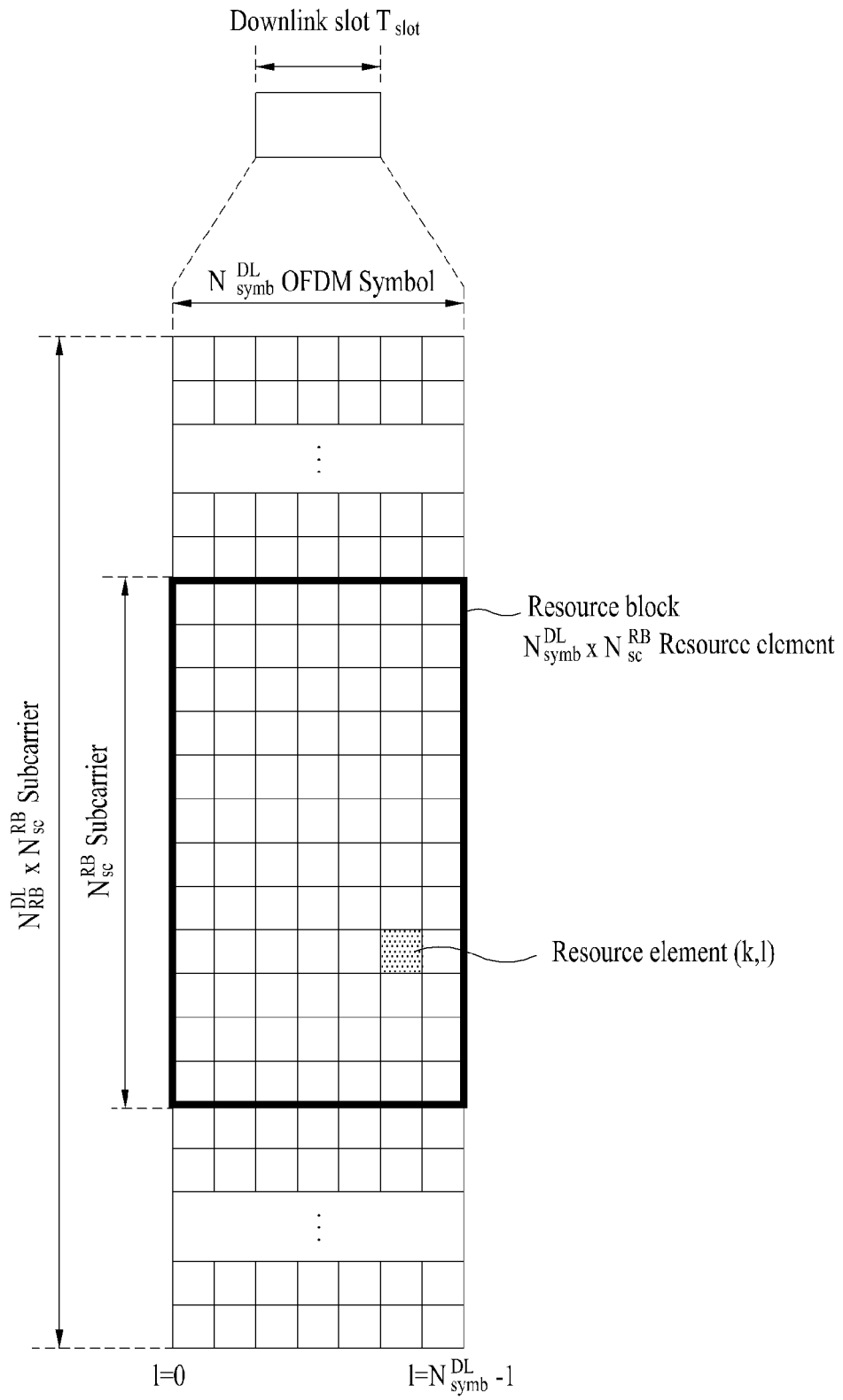
FIG. 7 is a diagram illustrating a control channel included in a control region of one subframe in a downlink radio frame.

FIG. 7 is a diagram illustrating a control channel included in a control region of one subframe in a downlink radio frame.

Referring to FIG. 7, the subframe includes fourteen (14) OFDM symbols. First one to three OFDM symbols are used as the control region in accordance with subframe configuration, and the other thirteen to eleven OFDM symbols are used as the data region. In FIG. 7, R1 to R4 represent reference signals (RS) (or pilot signals) of antennas 0 to 3. The RS is fixed by a given pattern within the subframe regardless of the control region and the data region. The control channel is allocated to a resource to which the RS is not allocated in the control region, and a traffic channel is also allocated to a resource to which the RS is not allocated in the data region. Examples of the control channel allocated to the control region include a Physical Control Format Indicator Channel (PCFICH), a Physical Hybrid-ARQ Indicator Channel (PHICH), and a Physical Downlink Control Channel (PDCCH).

Hereinafter, a method for reducing pilot overhead in the LTE/LTE-A system in accordance with the present invention will be described.

In the communication system according to the embodiment of the present invention, a CRS of the physical antenna port 0 and the control channels based on 1Tx antenna scheme, such as PDCCH, PHICH, and PCFICH, may be transmitted to the control region, and a CRS of the antenna port 0 and spatially multiplexed data may be transmitted to the PDSCH region. In this case, the receiving end uses only a CRS of the PDSCH region for decoding of the PDSCH.

A pattern of one antenna port among the patterns defined for the antenna ports of the related art is used as the CRS pattern of the PDSCH region, and the same CRS sequence or different CRS sequences are transmitted to the respective transmitting antennas (or transmitting antenna group). Even in the case that the same CRS sequence is transmitted to the respective transmitting antennas, a communication channel of valid quality is formed by one receiving antenna (or receiving antenna group) together with one transmitting antenna (or transmitting antenna group), and a channel of a poor level is formed by one receiving antenna together with the other transmitting antennas (or transmitting antenna group). Accordingly, there is no problem in channel estimation, and the base station may perform spatial multiplexing transmission without precoding scheme. For example, in FIGS. 3 and 4, the transmitting antennas (or transmitting antenna group) k1 and k2 are the transmitting antennas (or transmitting antenna group) of the base station, in which a communication channel of valid quality is formed, the two transmitting antennas (or transmitting antenna group) use the same CRS pattern, and may overlap the pilot by using the same or different sequences.

In the mean time, when it is intended to transmit data layers less than the number of communication channels of valid quality, it is preferable that data are transmitted repeatedly per transmitting antenna (or transmitting antenna group). For example, if the transmitting antennas (or transmitting antenna group) in which communication channels of valid quality are k1 to k4 and the number of data layers to be transmitted are 2, the data of the first data layer may be transmitted using the transmitting antennas (or transmitting antenna group) k1 and k3, and the data of the second data layer may be transmitted using the transmitting antennas (or transmitting antenna group) k2 and k4. In this case, the transmitted data may be expressed through a precoding matrix W, and one value not 0 may be provided in one row as expressed by the following Equation 1. The precoding matrix W may be changed per data tone, and may be varied per a certain resource region such as PRB. Even the CRS RE transmits a pilot using the precoding matrix W.

$$W = \begin{cases} \begin{bmatrix} w_{11} & 0 \\ 0 & w_{22} \\ w_{31} & 0 \\ 0 & w_{42} \end{bmatrix} \text{ at data } RE, \\ \alpha \begin{bmatrix} w_{11} & 0 \\ 0 & w_{22} \\ w_{31} & 0 \\ 0 & w_{42} \end{bmatrix} \text{ at } CRS\ RE \end{cases}$$  [Equation 1]

In the mean time, if the number of communication channels of valid quality is equal to the number of data layers, a preferred example of W is an identity matrix.

In addition, a CRS of 2Tx and the control channels based on 2Tx diversity scheme, such as PDCCH, PCFICH and PHICH, may be transmitted to the control region, and the PDSCH may be supported by transmission of data layers more than 2. In other words, among the patterns defined for each of antenna ports of the related art, a plurality of pilot sequences are transmitted using patterns of two antenna ports. For example, the transmitting antennas (or transmitting antenna group) k1 and k2 of the base station transmit pilot sequences to the CRS of the antenna port 0, and the transmitting antenna (or transmitting antenna group) k3 and k4 transmit pilot sequences to the CRS of the antenna port 1. In this case, the transmitting antennas (or transmitting antenna group) k1 to k4 respectively transmit different data to the PDSCH.

According to another embodiment, the CRS of the antenna port 0 and the control channel based on 1Tx scheme are transmitted to the control region, and the pattern of the antenna port 4 or 5 among the patterns defined for each of the antenna ports of the related art and a plurality of data may be transmitted to the PDSCH. At this time, the CRS may be transmitted to the PDSCH.

<IEEE802.16m System>

Prior to description of a method for reducing pilot overhead in accordance with the present invention, a structure of a radio frame of the LTE system will be described.

Figure 8:
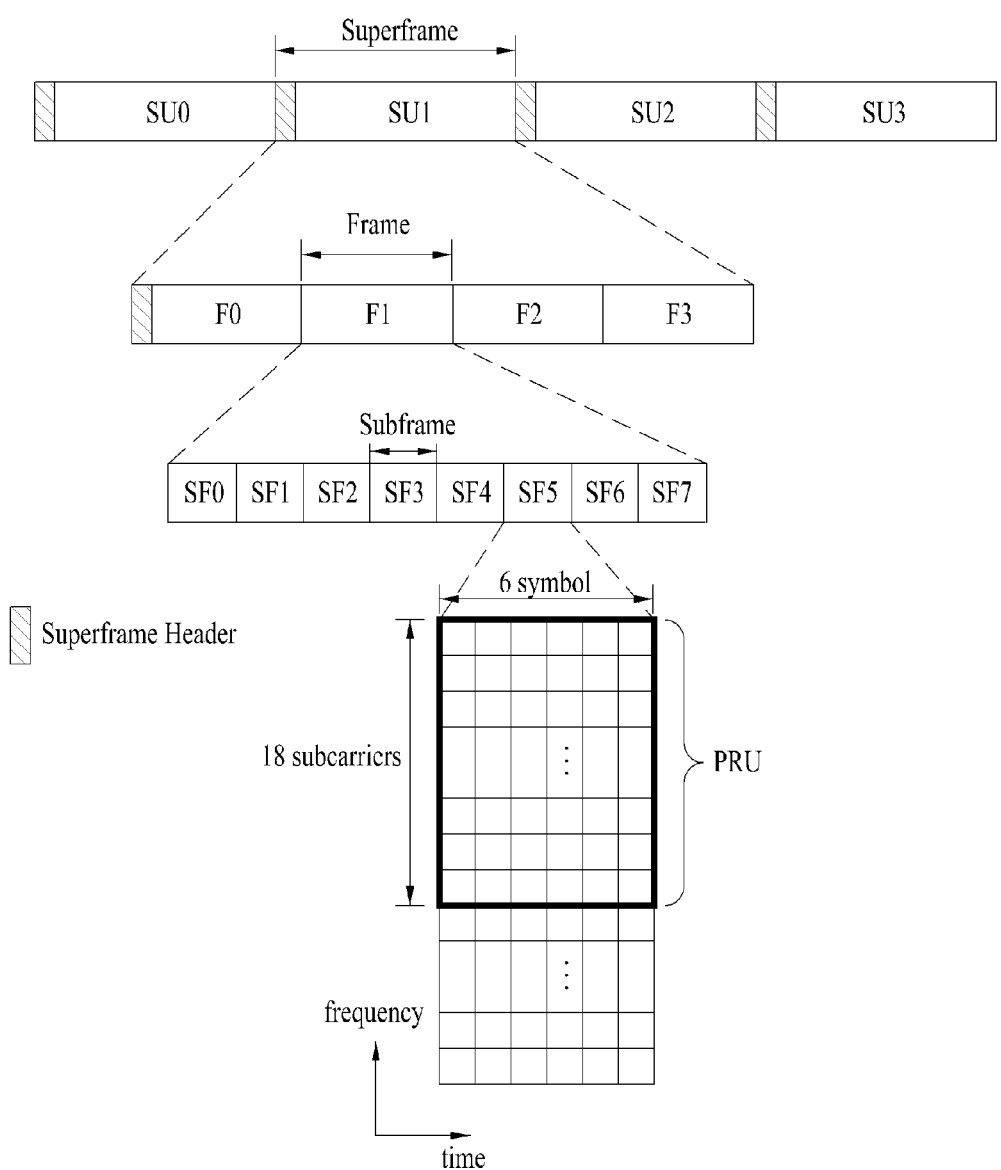
FIG. 8 is a diagram illustrating an example of a structure of a radio frame in an IEEE 802.16m system.

FIG. 8 is a diagram illustrating an example of a structure of a radio frame used in an IEEE 802.16m system.

Referring to FIG. 8, the radio frame includes superframes SU0 to SU3 of 20 ms that support a bandwidth of 5 MHz, 8.75 MHz, 10 MHz or 20 MHz. Each superframe includes four frames F0 to F3 of 5 ms having the same size, and starts with a super frame header (SFH). The super frame header carries essential system parameters and system configuration information.

Each of the frames includes eight subframes SF0 to SF7. The subframes are allocated for downlink or uplink transmission. Each subframe includes a plurality of OFDM symbols in a time domain and a plurality of subcarriers in a frequency domain. The OFDM symbols may be referred to as OFDMA symbols or SC-FDMA symbols depending on a multiplexing access mode. The number of OFDM symbols included in one subframe may be varied depending on channel bandwidth and cyclic prefix (CP) length.

A type of the subframe may be defined depending on the number of OFDM symbols included in the subframe. For example, the type of the subframe may be defined in such a manner that subframe type-1 includes six OFDM symbols, subframe type-2 includes seven OFDM symbols, subframe type-3 includes five OFDM symbols, and subframe type-4 includes nine OFDM symbols. One frame may include the same type subframes or different types of subframes. In particular, type-4 subframe that includes nine OFDM symbols is applied to only an uplink subframe that supports Wireless-MAN-OFDMA frame of a channel bandwidth of 8.75 MHz.

The subframe includes a plurality of physical resource units (PRUs) in the frequency domain. The PRU is a basic unit for resource allocation, and includes a plurality of contiguous OFDM symbols in the time domain and a plurality of contiguous subcarriers in the frequency domain. For example, the number of OFDMA symbols within the PRU may be the same as the number of OFDM symbols included in the subframe. Accordingly, the number of OFDM symbols within the PRU may be determined depending on the type of the subframe. In the mean time, the number of subcarriers within the PRU may be 18. In this case, the PRU includes 6 OFDM symbols×18 subcarriers. The PRU may be referred to as a distributed resource unit (DRU) or a contiguous resource unit (CRU) depending on a resource allocation type.

The aforementioned structure is only exemplary. Accordingly, various modifications may be made in the length of the superframe, the number of subframes included in the frame, the number of OFDMA symbols included in the subframe, and parameters of OFDMA symbols. For example, the number of subframes included in the frame may be varied depending on the channel bandwidth and the CP length.

Figure 9:
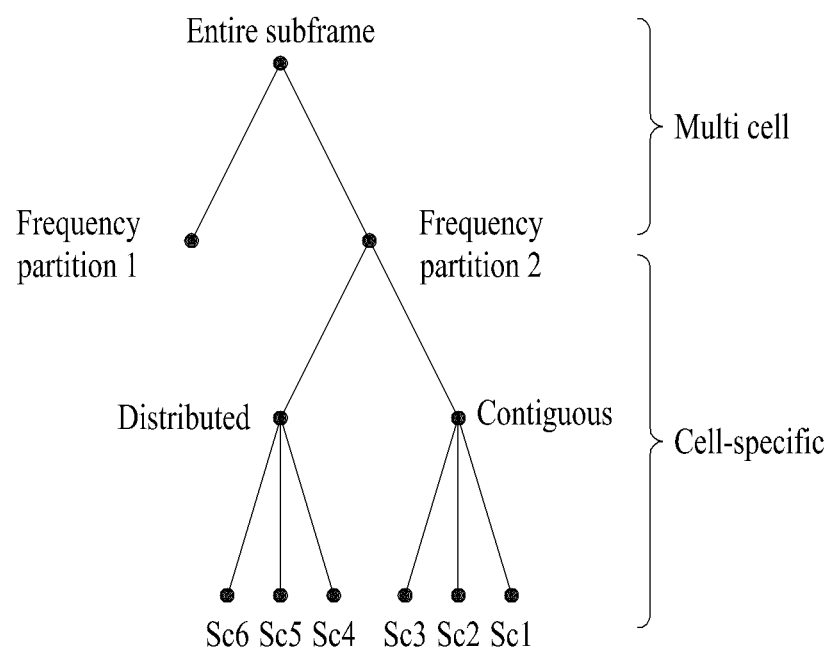
FIG. 9 is a diagram illustrating an example of a physical structure of a subframe in an IEEE 802.16m system.

FIG. 9 is a diagram illustrating an example of a physical structure of a subframe in an IEEE 802.16m system.

Referring to FIG. 9, the subframe may be divided into at least one frequency partition (FP). Although FIG. 9 illustrates that the subframe is divided into two frequency partitions, the number of frequency partitions is not limited to the example of FIG. 9.

Each frequency partition includes one or more PRUs. A distributed resource allocation scheme and/or a contiguous resource allocation scheme may be applied to each frequency partition.

A logical resource unit (LRU) is a basic logical unit for the distributed resource allocation scheme and the contiguous resource allocation scheme. A logical distributed resource unit (LDRU) includes a plurality of subcarriers distributed in the frequency domain. The size of the LDRU is the same as that of the PRU. The LDRU may be referred to as a distributed LRU (DLRU). A logical contiguous resource eunit (LCRU) includes contiguous subcarriers. The size of the LCRU is the same as that of the PRU. The LCRU may be referred to as a contiguous LRU (CLRU).

Hereinafter, a method for reducing pilot overhead in the IEEE 802.16m system in accordance with the present invention will be described.

First of all, it is assumed that the number of transmitting antennas (or transmitting antenna group) in which a communication channel of valid quality is formed is 4, and the number of receiving antennas (or receiving antenna group) of the high-speed train is 4 or more. In this case, the base station may support transmission of maximum four data streams, and should use sixteen subcarriers per PRU as pilot tones to support transmission of four data streams. However, if a transmission power is controlled to allow each receiving antenna (or receiving antenna group) to receive data from maximum one transmitting antenna (or transmitting antenna group) only, even though a pilot pattern corresponding to one data stream is used, a channel of each transmitting antenna may be estimated. If a pilot pattern corresponding to 1 data stream of the 802.16m system of the related art is used, six subcarriers are only used per physical resource unit as pilot tones in case of the subframe type-1, whereby pilot overhead may be reduced as much as 10%.

In the resource region where the PRU is the distributed resource unit, the other resource regions except for the control channel such as advanced-MAP (A-MAP) may be used for data transmission. In the 802.16m wireless communication system according to the related art, since two pilot patterns are defined for data transmission region, spatial multiplexing of multiplexing order 2 or SFBC should be used. However, under the environment of transmitting and receiving antenna structure and arrangement suggested in the present invention, the base station may support transmission of more data streams.

In other words, if the number of defined pilot patterns is 2 like the resource region where the PRU includes the distributed resource unit, in order to transmit $M_t$ data streams, pilot sequences corresponding to data stream index 0 to ($M_t/2-1$) may be allocated to one pilot pattern, and pilot sequences corresponding to ($M_t/2$) to ($M_t-1$) may be allocated to the other one pilot pattern.

For example, the transmitting antennas (or transmitting antenna group) k1 and k2 of the base station may transmit the pilot sequences by using one pilot pattern and the transmitting antennas (or transmitting antenna group) k3 and k4 may transmit the pilot sequences by using the other one pilot pattern. In this case, when the control channel such as A-MAP is transmitted, the transmitting antennas (or transmitting antenna group) k1 and k2 of the base station transmit control data $d_{k1}$, and the transmitting antennas (or transmitting antenna group) k3 and k4 transmit control data $d_{k2}$. On the other hand, when general traffic data are transmitted, the transmitting antennas (or transmitting antenna group) k1 to k4 of the base station respectively transmit different traffic data $d_{k1}$ to $d_{k4}$. This is advantageous in that more data may be transmitted while the transmission and reception system of the control channel such as A-MAP according to the 802.16m of the related art is maintained.

According to another embodiment, only one pilot pattern may be used and the other subcarriers may be used for data transmission. In other words, it may be considered that the transmitting antennas (or transmitting antenna group) k1 to k4 of the AP transmit the same pilot sequence through the pilot subcarrier and respectively transmit different data through data subcarrier. In this case, the pilot sequences per transmitting antenna (or transmitting antenna group) may be the same as or different from one another.

According to still another embodiment, a resource region where only one pilot stream is supported, for example, OL region, subband CRU or miniband CRU may be considered. In this case, in order to transmit $M_t$ data streams, only one of the existing pilot patterns may be used, and $M_t$ pilot sequences may be used, whereby pilot overhead may be reduced. In this case, sequences generated by cyclic shifting one sequence may be used as the $M_t$ pilot sequences. For example, a sequence having a cyclic shift value of 1 may be used for data streams of index 1, a sequence having a cyclic shift value of 2 may be used for data streams of index 2, and a sequence having a cyclic shift value of 3 may be used for data streams of index 3.

If the number of $M_t$ is greater than the length of the pilot sequence, channel estimation may be performed using the sequence cyclic shifted for a permuted sequence together with the sequence cyclic shifted for the basic pilot sequence. For example, if the basic pilot sequence is (p0, p1, p2, p3, p4, p5), $M_t$ may be selected from the cyclic shifted sequences (p5, p0, p1, p2, p3, p4), (p4, p5, p0, p1, p2, p3), (p3, p4, p5, p0, p1, p2), . . . , (p1, p2, p3, p4, p5, p0) and the sequences (p4, p1, p0, p3, p2, p5), (p5, p1, p0, p3, p2), (p2, p5, p1, p0, p3), . . . , (p0, p3, p2, p5, p4, p1) cyclic shifted for the permuted sequence (p1, p0, p3, p2, p5, p4). As described above, if different pilot sequences are used while the same pilot pattern is maintained, channel estimation of each data stream may more easily be performed using the same channel estimator.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Those skilled in the art will appreciate that the present invention may be carried out in other specific ways than those set forth herein without departing from the spirit and essential characteristics of the present invention. It is also obvious to those skilled in the art that claims that are not explicitly cited in each other in the appended claims may be presented in combination as an embodiment of the present invention or included as a new claim by a subsequent amendment after the application is filed.

The invention claimed is:

1. A method for transmitting a pilot sequence from a transmitting end to a receiving end in a multi-antenna wireless communication system, the method comprising:
   setting a same pilot pattern to each of a plurality of transmitting antennas;
   allocating different pilot sequences to the set pilot patterns; and
   transmitting the allocated pilot sequences to the receiving end,
   wherein at least one of the transmitting antennas forms a valid communication link with one of the receiving antennas,
   wherein, when a number of data streams intended to be transmitted is less than or equal to a size of the pilot sequence, the different pilot sequences include pilot sequences cyclic shifted for basic pilot sequences, and
   wherein, when a number of data streams intended to be transmitted is greater than a size of the pilot sequences, the different pilot sequences include pilot sequences selected as many as the number of data streams among cyclic shifted for basic pilot sequences and pilot sequences permuted and cyclic shifted for the basic pilot sequences.

2. The method according to claim 1, wherein, when there are a plurality of valid communication links, the plurality of communication links are mutually independent.

3. The method according to claim 1, when the number of data layers is smaller than that of the valid communication links, further comprising the step of transmitting at least one of the data layers to the receiving end through at least two or more of the transmitting antennas.

4. The method according to claim 1, wherein the transmitting antenna forming the valid communication link has a signal power received from the receiving antenna, the signal power being greater than a previously set threshold value.

5. A base station in a multi-antenna wireless communication system, the base station comprising:
   a processor configured to:
       set a same pilot pattern to each of a plurality of transmitting antennas; and
       allocate different pilot sequences to the set pilot patterns; and
   a transmission module configured to transmit the allocated pilot sequences to a receiving end,
   wherein at least one of the transmitting antennas of the base station forms a valid communication link with one of the receiving antennas,
   wherein, when a number of data streams intended to be transmitted is less than or equal to a size of the pilot sequence, the different pilot sequences include pilot sequences cyclic shifted for basic pilot sequences, and
   wherein, when a number of data streams intended to be transmitted is greater than a size of the pilot sequences, the different pilot sequences include pilot sequences selected as many as the number of data streams among cyclic shifted for basic pilot sequences and pilot sequences permuted and cyclic shifted for the basic pilot sequences.

6. The base station according to claim 5, wherein, when there are a plurality of valid communication links, the plurality of communication links are mutually independent.

7. The base station according to claim 5, wherein, when the number of data layers is smaller than that of the valid communication links, the transmission module repeatedly transmits at least one of the data layers to the receiving end through at least two or more of the transmitting antennas.

8. The base station according to claim 5, wherein the transmitting antenna forming the valid communication link has a signal power received from the receiving antenna, the signal power being greater than a previously set threshold value.

* * * * *